(12) United States Patent
Hendriks et al.

(10) Patent No.: US 6,192,022 B1
(45) Date of Patent: Feb. 20, 2001

(54) FOCUSING A LIGHT BEAM MORE THAN THIRTY FOCAL DEPTHS FROM THE APLANATIC POINT WITH A PLANO-CONVEX LENS

(75) Inventors: Bernardus H. W. Hendriks; Josephus J. M. Braat, both of Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/209,091

(22) Filed: Dec. 10, 1998

Related U.S. Application Data

(63) Continuation-in-part of application No. 09/075,677, filed on May 11, 1998.

(30) Foreign Application Priority Data

May 23, 1997 (EP) .................................................. 97201540

(51) Int. Cl.[7] ........................................................ G11B 7/00
(52) U.S. Cl. ........................ 369/112; 369/44.23; 369/94
(58) Field of Search .............................. 369/112, 44.14, 369/43, 44.23, 44.15, 122, 94; 359/664, 16, 615, 819, 811

(56) References Cited

U.S. PATENT DOCUMENTS

| 4,334,300 | * | 6/1982 | Arquie et al. | 369/112 |
|---|---|---|---|---|
| 4,791,625 | * | 12/1988 | Nakamura | 369/112 |
| 4,855,987 | * | 8/1989 | Versluis | 369/112 |
| 5,125,750 | * | 6/1992 | Corle et al. | 359/819 |
| 5,497,359 | * | 3/1996 | Mamin et al. | 369/44.15 |
| 5,610,734 | * | 3/1997 | Aharoni et al. | 359/16 |
| 5,729,393 | * | 3/1998 | Lee et al. | 359/819 |
| 5,764,613 | * | 6/1998 | Yamamoto et al. | 369/112 |
| 5,881,042 | * | 3/1999 | Knight | 369/112 |

FOREIGN PATENT DOCUMENTS

0727777A1 8/1996 (EP) ................................ G11B/7/12

OTHER PUBLICATIONS

"Principles of Optics", By M. Born and E. Wolf, 6th Edition, Pergamon Press, p. 253.

* cited by examiner

*Primary Examiner*—Tan Dinh
*Assistant Examiner*—Kim-Kwok Chu
(74) *Attorney, Agent, or Firm*—Michael E. Belk

(57) ABSTRACT

A device is described for optically scanning a record carrier with a radiation beam having a high numerical aperture. The radiation beam is focused on the record carrier by means of an objective lens and a plano-convex lens. The plano-convex lens has a gap with the record carrier of several tens of micrometers. It focuses the radiation beam to a point at least 30 focal depths away from an aplanatic point of the plano-convex lens. As a consequence, the lens has a relatively large tolerance for sideways movements.

14 Claims, 2 Drawing Sheets

FOCUSING A LIGHT BEAM MORE THAN THIRTY FOCAL DEPTHS FROM THE APLANATIC POINT WITH A PLANO-CONVEX LENS

CROSS REFERENCE TO RELATED APPLICATIONS

This is a continuation-in-part of application Ser. No. 09/075,677, filed May 11, 1998.

FIELD OF THE INVENTION

The invention relates to the field of lens systems for scanning optical information carriers.

BACKGROUND OF THE INVENTION

The invention relates to an optical scanning device for optically scanning a record carrier comprising an information layer and a transparent layer, the device comprising an objective lens and a piano-convex lens for converging a radiation beam through the transparent layer to a focus on the information layer, the plano-convex lens having a convex surface facing the objective lens, and a planar surface facing the transparent layer.

The amount of information that can be stored on an optical record carrier depends inter alia on the size of the radiation spot formed by the scanning device on the information layer of the record carrier. The information density and hence the amount of stored information can be increased by decreasing the size of the spot. The spot size can be reduced by increasing the numerical aperture of the radiation beam forming the spot. When using a single objective lens, such an increase of the numerical aperture is in general accompanied by a decrease of the free working distance of the lens forming the radiation beam, i.e. the smallest distance between the record and the lens. At higher numerical apertures, the manufacturing costs of such objective lenses become high, the field of the lens reduces and the dispersion of the material the lens is made of gives increasing problems. The problems may be mitigated by inserting a plano-convex lens between the objective lens and the record carrier. The plano-convex lens, sometimes called a slider lens or a solid immersion lens, is arranged at a very small distance above the record carrier. The convergence of the radiation beam is then distributed over the objective lens and the plano-convex lens. An advantage of the use of the plano-convex lens is that it hardly adds aberrations to the radiation beam.

A scanning device having such a plano-convex lens is known from the European patent application no. 0 727 777. The device comprises an optical head in which an objective lens and a plano-convex lens converge a radiation beam to a numerical aperture (NA) of 0.84 for scanning the record carrier. The plano-convex lens is arranged at a small height above the record carrier. The lens may be mounted on a slider in sliding contact with the record carrier or floating on a thin air layer. The lens has a free working distance of several micrometers. When the optical head of the device, flying above the surface of the record carrier, collides with a dust particle on the surface, the head and record carrier will be damaged. The free working distance should therefore be larger than the size of the contamination expected on the record carrier. A disadvantage of the known device is that the manufacture of the optical head of the device becomes increasingly difficult at increasing free working distance.

The above citations are hereby incorporated in whole by reference.

SUMMARY OF THE INVENTION

It is an object of the invention to provide a scanning device for scanning a record carrier with a high numerical aperture radiation beam, which can be easily manufactured.

The object is achieved in accordance with the invention by a scanning device as described in the opening paragraph, which is characterized in that the objective lens and plano-convex lens are designed for forming a focus at a distance of more than thirty focal depths of the converging radiation beam from an aplanatic point of the plano-convex lens.

It has turned out that the difficult manufacture of the known optical head is due to the tight tolerance on sideways displacements of the plano-convex lens relative to the position of the objective lens. The gap between the flat surface of the plano-convex lens and the record carrier introduces spherical aberration in the radiation beam which is focused on the record carrier. The spherical aberration can be compensated in the objective lens. As a result, an aberrated beam enters the plano-convex lens instead of an unaberrated beam. This aberration makes the centring of the objective lens and the known plano-convex lens in a direction perpendicular to the optical axis of the lenses critical. The centring tolerance becomes more tight with increasing free working distance. The objective lens and the plano-convex lens are preferably separately movable along their optical axes for a proper tracking of the record carrier. The tight positional tolerance on the known plano-convex lens and the objective lens makes the actuators for these movements expensive.

The tight tolerance of the known optical head is a consequence of the design of the optical head. In applications where plano-convex lenses are used for forming a high numerical aperture beam, such as high-magnification microscope objective lenses and optical heads for scanning high-density optical record carriers, the radiation beam is always focused in an aplanatic point of the plano-convex lens, because only then the plano-convex lens increases the numerical aperture of the beam without introducing monochromatic aberrations. See for example the book "Principles of Optics" by M. Born and E. Wolf, sixth edition, Pergamon Press, 1980, page 253.

The tolerance of the optical head according to the invention is substantially larger than that of the known optical head because of the different design of the objective lens and the plano-convex lens. The inventive design does not focus the radiation beam at an aplanatic point of the plano-convex lens, but at a point which does not coincide with such an aplanatic point. The relatively small increase of the aberrations introduced by the plano-convex lens according to the invention is accompanied by a relatively large increase in the tolerance for sideways movements of the lens. When the distance between the focus point and an aplanatic point is more than thirty focal depths of the radiation beam away from an aplanatic point, the increased tolerance substantially simplifies the manufacture of the optical head. A focal depth is equal to $\lambda/(4(1-\cos\alpha))$, where $\lambda$ is the wavelength of the radiation beam and a is the half-angle of the cone of the converging beam in air. The focal depth of a converging beam having a half-angle of $\alpha$ in a medium having a refractive index n is approximately n times larger than in air. The numerical aperture NA is equal to $(n \sin \alpha)$. When the free working distance is increased to a few tens of micrometers, where dust particles can pass between the lens and the record carrier, the tolerance is relatively large. For gaps larger than 50 μm, the distance between the focus point and an aplanatic point is preferably larger than one hundred focal depths.

To increase the tolerance for thickness variations of the transparent layer of the record carrier, the refractive index $n_1$ of the transparent layer is preferably larger than the refractive index $n_2$ of the plano-convex lens.

The spherical aberration caused by the gap between the plano-convex lens, having a refractive index lower than $n_2$, and the transparent layer, having a refractive index larger than $n_2$, at least partly compensate one another. The amount of spherical aberration to be introduced by the objective lens is then reduced, which in turn further increases the mentioned positional tolerance. The refractive indices are preferably related through $(n_1-1) > 1.03 (n_2-1)$.

The distance between the focus and an aplanatic point depends in general on the size of the gap between the plano-convex lens and the record carrier. The preferred distance measured in micrometers is substantially equal to $3Rd_{gap}$, where R is the radius of the convex surface in millimeters and $d_{gap}$ the distance between the planar surface and the transparent layer in micrometers. The distance depends on the actual design of the objective lens and the plano-convex lens. The distance will in general lie within +150% to −50% from the above value, and, if $n_1 > n_2$, within ±20% of the above value. The focus is preferably arranged between the two aplanatic points of the plano-convex lens.

To obtain a minimum spherical aberration at the location of the focus, the size of the gap, $d_{gap}$, depends preferably on the refractive index $n_2$ of the plano-convex lens and $n_1$ of the transparent substrate according to the following relation: $d_{gap}/d_S = (n_2/n_1^3)*(n_1^2-n_2^2)/(n_2^2-1)$. The value of $d_{gap}$ preferably complies with the relation within 40% for values of $d_S$ larger than $d_{gap}$, where $d_S$ is the thickness of the transparent layer. The value of $d_S$ is preferably larger than the value of $d_{gap}$ in order to obtain refractive indices of available materials.

The plano-convex lens according to the invention is designed for a magnification different from that of the known plano-convex lens. The known lens has a magnification of $1/n_2$, where $n_2$ is the refractive index of both the lens body and the transparent layer. The known lens therefore operates in an aplanatic point and complies with the sine condition. The plano-convex lens according to the invention operates preferably at a magnification of between $1.1/n_2^2$ and $0.99/n_2$, and more preferably within a range between $0.7/n_2$ and $0.99/n_2$. In this range the amount of spherical aberration compensated in the objective lens is smaller than for an objective lens in the known device which has a similar size of the gap. This change from the known design makes the plano-convex lens more tolerant to sideways movements at a large free working distance. When, additionally, the refractive index $n_1$ of the transparent layer is chosen larger than the refractive index $n_2$ of the plano-convex lens, the tolerance for sideways movements is further increased and the tolerance for thickness variations of the transparent layer is increased.

A second aspect of the invention relates to an optical scanning device for optically scanning a record carrier comprising an information layer and a transparent layer having a refractive index $n_1$, the device comprising an objective lens and a plano-convex lens for converging a radiation beam through the transparent layer to a focus on the information layer, the plano-convex lens having a convex surface facing the objective lens, a planar surface facing the transparent layer, a magnifying power and a refractive index $n_2$, characterized in that the magnifying power of the plano-convex lens is substantially equal to $1/n_1$. The specific choice of refractive indices and magnifying power make the optical head very tolerant for thickness variations of the transparent layer and a distance between the plano-convex lens and the record carrier that is relatively independent of the variations in the thickness of the transparent layer. The latter characteristic allows the plano-convex lens to be suspended above the record carrier at a constant height by e.g. an air bearing, without affecting the compensation of the spherical aberration changes due to the variations in the thickness.

A third aspect of the invention relates to an optical scanning device for optically scanning a first and second type of record carrier, the first type of record carrier comprising a first information layer and a first transparent layer having a first thickness, the second type of record carrier comprising a second information layer and a second transparent layer having a refractive index $n_1$ and a second thickness larger than the first thickness, the device comprising an objective lens and a plano-convex lens for converging a radiation beam through the first or second transparent layer to a focus on the information layer, the plano-convex lens having a convex surface facing the objective lens, a planar surface facing the transparent layer, a magnifying power and a refractive index $n_2$, characterized in that the magnifying power of the plano-convex lens is substantially equal to $1/n_1$. An advantage of the scanning device is that the distance between the plano-convex lens and the record carrier has substantially the same value for the first and second type of record carrier. Hence, the same suspension of the plano-convex lens can be used for both types of record carrier, thereby simplifying the design of the scanning device and improving its tolerance to crashes of the optical head of the scanning device into the record carrier.

A fourth aspect of the invention relates to an optical scanning device for optically scanning a record carrier comprising at least two adjacent information layers and a transparent spacer layer having a refractive index $n_1$ arranged between the information layers, the device comprising an objective lens and a plano-convex lens for converging a radiation beam to a focus on one of the information layers, the plano-convex lens having a convex surface facing the objective lens, a planar surface facing the transparent layer, a magnifying power and a refractive index $n_2$, characterized in that the magnifying power of the plano-convex lens is substantially equal to $1/n_1$. When changing the scanning from one information layer to another one, the axial position of the objective lens must be changed to move the focus of the radiation beam to the desired information layer, whereas the position of the plano-convex lens need not be changed. The distance between the plano-convex lens and the entrance surface of the record carrier can thus be kept at a fixed value, thereby simplifying the construction of the optical head of the scanning device.

The value of $n_1$ is preferably larger than the value of $n_2$ in the latter three scanning devices. The refractive indices $n_1$ and $n_2$ are preferably related through $(n_1-1) > 1.03 (n_2-1)$. The product of the magnifying power and the refractive index $n_1$ lies preferably within a range from 0.95 to 1.05.

The objects, advantages and features of the invention will be apparent from the following more particular description of preferred embodiments of the invention, as illustrated in the accompanying drawings.

DETAILED DESCRIPTION OF THE PREFERRED EMBODIMENTS

Figure 1:
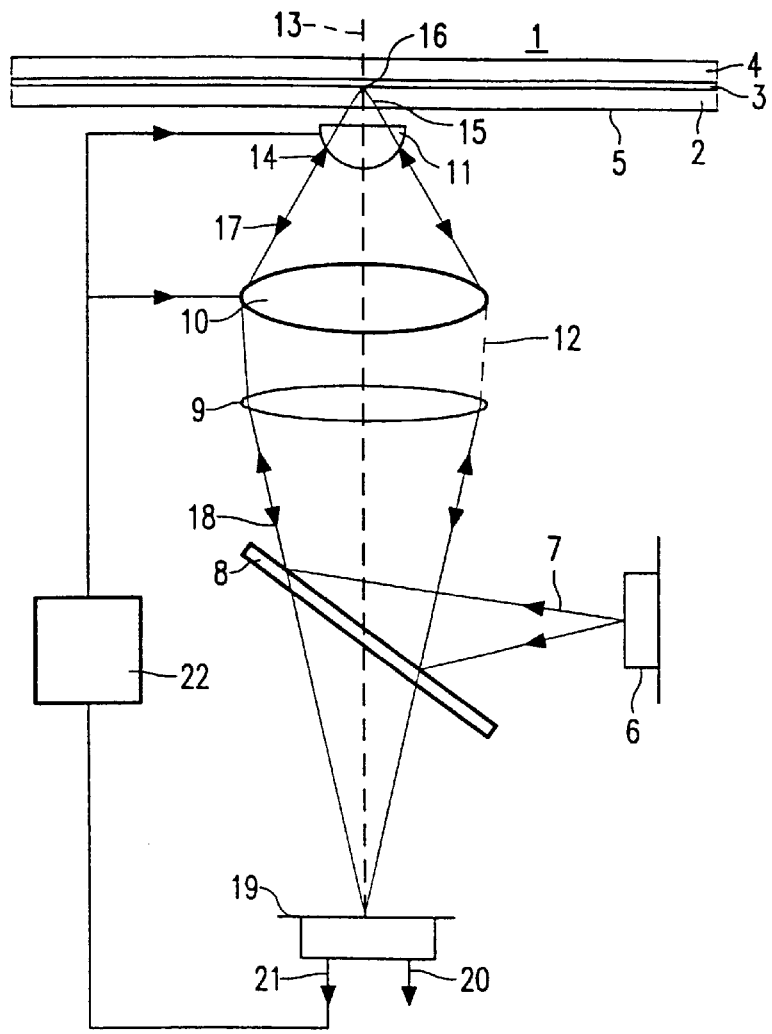
FIG. 1 shows a scanning device.

FIG. 1 shows a device for scanning an optical record carrier 1. The record carrier comprises a transparent layer 2, on one side of which an information layer 3 is arranged. The side of the information layer facing away from the transparent layer is protected from environmental influences by a protection layer 4. The side of the transparent layer facing the device is called the entrance face 5. The transparent layer 2 acts as a substrate for the record carrier by providing mechanical support for the information layer. Alternatively, the transparent layer may have the sole function of protecting the information layer, while the mechanical support is provided by a layer on the other side of the information layer, for instance by the protection layer 4 or by a further information layer and transparent layer connected to the information layer 3. Information may be stored in the information layer 3 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetization different from their surroundings, or a combination of these forms.

The scanning device comprises a radiation source 6, for example a semi-conductor laser, emitting a diverging radiation beam 7. A beam splitter 8, for example a semi-transparent plate, reflects the radiation towards a lens system. The lens system comprises a collimator lens 9, an objective lens 10 and a plano-convex lens 11. The collimator lens 9 changes the diverging radiation beam 7 to a collimated beam 12. The objective lens 10, having an optical axis 13, transforms the collimated radiation beam 12 into a converging beam 14 incident on the lens 11. The collimator lens 9 and the objective lens 10 may be combined into a single lens. The plano-convex lens 11 changes the incident beam 14 into a converging beam 15, which comes to a focus 16 on the information layer 3. The plano-convex lens 11 has a convex surface and a flat surface. The flat surface faces the transparent layer 2 and forms a gap between the lens and the layer. The piano surface may have a curvature, e.g. for aerodynamic purposes, the curvature being sufficiently small not to affect significantly the optical performance of the plano-convex lens. Although the objective lens 10 is indicated in the Figure as a single lens element, it may comprise more elements, and may also comprise a hologram operating in transmission or reflection, or a grating for coupling radiation out of a waveguide carrying the radiation beam. Radiation of the converging beam 15 reflected by the information layer 3 forms a reflected beam 17, which returns on the optical path of the forward converging beam 14. The objective lens 10 and the collimator lens 9 transform the reflected beam 17 to a converging reflected beam 18, and the beam splitter 8 separates the forward and reflected beams by transmitting at least part of the reflected beam 18 towards a detection system 19. The detection system captures the radiation and converts it into one or more electrical signals. One of these signals is an information signal 20, the value of which represents the information read from the information layer 3. Another signal is a focus error signal 21, the value of which represents the axial difference in height between the focus 16 and the information layer 3. The focus error signal is used as input for a focus servo controller 22, which controls the axial position of the objective lens 10 and/or the plano-convex lens 11, thereby controlling the axial position of the focus 16 such that it coincides substantially with the plane of the information layer 3. The part of the detection system, including one or more radiation-sensitive detection elements and an electronic circuit processing the output signal of the detection elements, used for generating the focus error is called the focus error detection system. The focus servo system for positioning the lens system comprises the focus error detection system, the focus servo controller and an actuator for moving the lens system.

The gap, i.e. the distance between the planar surface of lens 11 and the entrance surface 5 of the record carrier 1, should be maintained substantially at a nominal value. This can be attained by using a passive air bearing construction carrying lens 11 and designed to maintain the gap at its nominal value. It is also possible to use an optically derived error signal which represents the deviation of size of the actual gap from its nominal value; a special actuator then keeps the plano-convex lens at its prescribed distance from the transparent layer by using the error signal as an input signal for the actuator servo loop. The actuator of the lens 10 is controlled by the focus error signal 21 to keep the focus 16 on the information layer 3.

The spherical aberration which arises when the radiation beam has to be focused through a transparent layer which is thicker than the design thickness of the layer, is compensated for by a focusing action of the objective lens. The focusing action causes the plano-convex lens to produce, due to the changing magnification, an amount of spherical aberration which cancels the aberration produced by the thicker transparent layer. During the focusing action of the objective lens, the gap should be maintained substantially at its nominal value in the above-mentioned way. The variations in the thickness of the transparent layer are in general of the order of a few percent of the nominal thickness, e.g. less than 10 $\mu$m for a nominal layer thickness of 100 $\mu$m.

Figure 2:
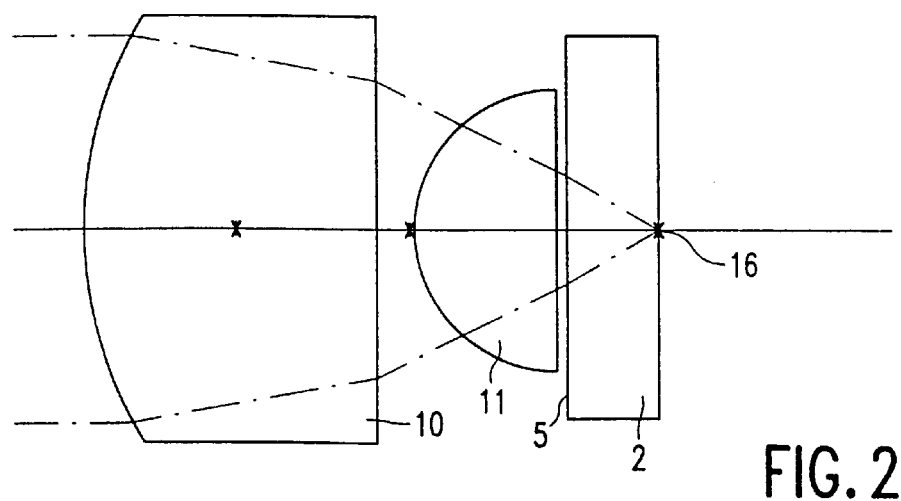
FIG. 2 shows an objective lens and a plano-convex lens.

FIG. 2 shows an enlargement of the objective lens 10 and the plano-convex lens 11. The objective lens 10 may be a mono-aspherical plano-convex lens or a bi-aspherical lens. The objective lens 10 is designed in a known way to compensate for the spherical aberration introduced by the plano-convex lens 11 and the transparent layer 2, thereby making the radiation beam near the focus 16 nominally substantially free from spherical aberration.

Table I shows design parameters of the plano-convex lens 11. The parameters in the table have the following meaning: $d_{gap}$ is the distance between the flat surface of the plano-convex lens 11 and the entrance face 5 of the transparent layer 2; R is the radius of the convex surface of the plano-convex lens; $n_2$ is the refractive index of the lens material; $\Delta s$ is the distance between the focus point and the aplanatic point corresponding to a magnification of $1/n_2$. $\Delta s$ is measured in the direction of the aplanatic point corresponding to a magnification of $1/n_2^2$ and in a medium having a refractive index of $n_2$. B is the magnification of the plano-convex lens in units of $1/n_2$. F is the root-mean-square (RMS) wavefront error close to the focal point at a distance of 30 $\mu$m in the field of the lens. D is the RMS wavefront error for a sideways displacement of the plano-convex lens of 30 $\mu$m. T is the RMS wavefront error when the thickness of the transparent layer 2 is 30 $\mu$m less than the design thickness.

The wavelength of the radiation is 650 nm and the NA of the converging beam 15 is 0.85 in air. The focal depth is equal to 0.343 μm. The design thickness of the transparent layer 2 is identical for the designs 1–7 and is equal to 600 μm. The refractive index of the layer is 1.5806, i.e. the refractive index of polycarbonate (PC) at a wavelength of 650 nm. The plano-convex lens 11 of the designs 1–3, 5 and 6 is made of polycarbonate. The plano-convex lens of the design 4 and 7 is made of the glasses BK10 and K5 respectively from the Schott catalog. The axial thickness of the plano-convex lens is defined by the gap thickness, the thickness of the transparent layer, the radius of curvature and the magnification of the plano-convex lens.

TABLE I

Design parameters of plano-convex lens

| No. | $d_{gap}$ (μm) | R (mm) | $n_2$ | Δs (μm) | B (1/$n_2$) | F (mλ) | D (mλ) | T (mλ) |
|---|---|---|---|---|---|---|---|---|
| 1 | 50 | 1.2492 | 1.5806 | 0 | 1.000 | 24 | 61 | 57 |
| 2 | 50 | 1.2492 | 1.5806 | 30 | 0.989 | 24 | 55 | 51 |
| 3 | 50 | 1.2492 | 1.5806 | 295 | 0.863 | 31 | 20 | 47 |
| 4 | 50 | 1.2492 | 1.4901 | 197 | 0.923 | 25 | 16 | 10 |
| 5 | 25 | 1.2350 | 1.5806 | 0 | 1.000 | 21 | 33 | 29 |
| 6 | 25 | 1.2350 | 1.5806 | 216 | 0.900 | 14 | 15 | 17 |
| 7 | 25 | 1.2350 | 1.5238 | 92 | 0.961 | 20 | 13 | 5 |

Design no. 1 in the table shows the parameters of a plano-convex lens for a gap of 50 μm. The refractive index of the lens material is equal to the refractive index of the transparent layer 2, and the focus point coincides with the aplanatic point corresponding to a magnification of $1/n_2$.

Design no. 2 uses the same refractive index as that of PC, but has a focus of the beam at a distance of 30 μm from the aplanatic point. This distance corresponds to 87 focal depths. The RMS wavefront error at 30 μm decentring reduces from 61 to 55 mλ. If the scanning device imposes a tolerance of 30 μm on the decentring, the 10% reduction of the accompanying wavefront error can be used advantageously in reducing other tolerances in the often tight optical wavefront error budget of the scanning device. Since the wavefront error is to a first approximation linear in the decentring, design no. 2 allows a 10% larger tolerance on the decentring of the plano-convex lens. The tolerance on thickness variations of the transparent layer has also increased by more than 10%.

Design no. 3 uses again the refractive index of PC but has a focus at a distance of 295 μm from the aplanatic point. The tolerance on the decentring has been increased by a factor of three at the cost of a slight reduction of the field of the lens. The tolerance on the layer thickness has also increased.

Design no. 4 uses a refractive index lower than that of the transparent layer and has a focus 197 μm away from the aplanatic point. The field of the lens is about equal to the field of the lens according to the prior art design no. 1. The decentring tolerance has been decreased even further than in design no.3 and the thickness tolerance has increased by more than a factor of five in comparison with design no. 1.

Design no. 5 shows the parameters of a plano-convex lens for a gap of 25 μm. The refractive index of the lens material is equal to the refractive index of PC, and the focus point coincides with the aplanatic point corresponding to a magnification of $1/n_2$.

Design no. 6 uses the refractive index of PC but has a focus at a distance of 216 μm from the aplanatic point. Both the field of the lens, the tolerance on the decentring, as well as the tolerance on the layer thickness have increased by about a factor of two.

Design no. 7 uses a refractive index lower than that of the transparent layer and has a focus 92 μm away from the aplanatic point. The field is still larger than the field of design no. 5. The decentring tolerance has increased even further than in design no. 6. The thickness tolerance has increased fourfold in comparison with design no. 5. When the optical budget of the scanning device for sideways movements is 30 mλ, the plano-convex lens according to design no. 5 has a 27 μm tolerance for sideways movements, whereas the plano-convex lens according to design no. 7 has a 69 μm tolerance.

The tolerance of the optical head for thickness variations of the transparent layer 2 can be relatively large if the magnifying power B of the plano-convex lens 11 is made substantially equal to $1/n_1$, i.e. the inverse of the refractive index of the transparent layer. This can be understood as follows. When the distance between lens 10 and lens 11 changes, the conjugate distances of lens 11 change. If the image conjugate of lens 11 changes by an amount of Δl, the spherical aberration W in the radiation beam 15 changes by $$\Delta W_1 = \frac{1}{8}(1 - B^2)NA^4 \Delta l$$

The spherical aberration introduced by a change $\Delta d_1$ in the thickness of the transparent layer 2 into the radiation beam 15 is equal to $$\Delta W_2 = -\frac{1}{8}\frac{1}{n_1^3}(1 - n_1^2)\Delta d_1 \, NA^4$$

If the image conjugate of lens 11 changes by Δl and the thickness of the transparent layer by $\Delta d_1$, then the distance $d_2$ between the lens 11 and the entrance face of the record carrier must change by $\Delta d_2$ to keep the focus of the radiation beam on the information layer, where $$\Delta l = \Delta d_2 + \frac{\Delta d_1}{n_1}$$

The spherical aberration introduced by the thickness variation may be compensated by choosing $\Delta W_1 = \Delta W_2$, resulting in a value of Δl equal to $$\Delta l = -\frac{1}{n_1^3}\frac{(1 - n_1^2)}{1 - B^2}\Delta d_1$$

The resulting change $\Delta d_{gap}$ in the distance $d_{gap}$ between the flat surface of the plano-convex lens 11 and the entrance face 5 of the transparent layer 2 is $$\Delta d_{gap} = -\frac{\Delta d_1}{n_1}\Delta l = -\frac{\Delta d_1}{n_1}\left[1 + \frac{(1/n_1^2 - 1)}{1 - B^2}\right]$$

The term between square brackets can be made zero by taking the value of B equal to $1/n_1$. In that case the change $\Delta d_{gap}$ in the distance $d_{gap}$ is in this approximation independent of the variations $\Delta d_1$ in the thickness of the transparent layer 2. In other words, the free working distance of lens 11 is independent of the thickness of the transparent layer.

Figure 3:
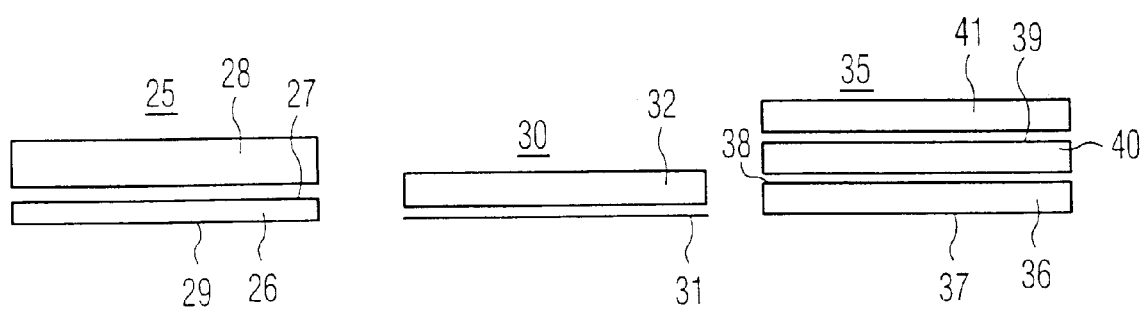
FIG. 3 shows three different types of record carrier.

The scanning device is suitable for scanning two different types of record carrier. FIG. 3 shows the first type of record carrier 25, comprising a transparent layer 26 having an entrance face 29 on which the radiation of the scanning device enters the record carrier. The record carrier 25 also comprises an information layer 27 and a protective layer 28. The second type of record carrier is the same record carrier 1 as shown in FIG. 1, having the transparent layer 2, information layer 3 and protective layer 4. The information layers 3 and 27 may have different or similar information densities and the information may be stored in different or similar types of marks in different or similar formats. The thickness of the transparent layer 26 may be zero, making the record carrier a so-called air-incident record carrier 30, as shown in FIG. 3, and comprising an information layer 31 and a protective layer or substrate 32. In a particular example, the transparent layer 27 is a 100 μm thickness poly-carbonate foil and the transparent layer 2 is a 600 μm thickness polycarbonate layer, whereas the information density of the information layer 27 is higher than that of information layer 3. The gap between the plano-convex lens 11 and the entrance surface 5 is chosen sufficiently small to realize the required high numerical aperture of the radiation beam 15 and sufficiently large to avoid crashes of the plano-convex lens 11 or its holder against the record carrier.

When the scanning is changed from a record carrier 1 of the first type to a record carrier 25 of the second type, the plano-convex lens 11 is positioned at the same height above the entrance face 29 as it had above the entrance face 5. The axial position of the objective lens 10 is controlled by the focus servo system such that the focus 16 coincides with the information layer 27. The positioning of both lenses 10 and 11 will have changed the distance between them in such a way that the lenses compensate the change in spherical aberration caused by the change in thickness of the transparent layer. Since the gap between the plano-convex lens 11 and the entrance face of both types of record carrier is substantially the same, the dynamic behaviour of the optical head will also be very similar for both types of record carrier.

A suitable plano-convex lens 11 for the above scanning device has the following design values. The wavelength of the radiation is 650 nm. The numerical aperture for scanning the record carrier 25 having a 100 μm polycarbonate transparent layer is equal to 0.85. The numerical aperture for scanning the record carrier 1 having a 600 μm polycarbonate transparent layer is equal to 0.60. The refractive index of polycarbonate at 650 nm wavelength is equal to 1.5806. The lens 11 is made of the Schott glass FK3 with a refractive index of 1.46. The radius of curvature of the convex surface of the lens 11 is 1.25 mm, and the thickness of the lens on the optical axis is equal to 1.25 mm. The value of $n_1B$ for the lens 11 is 0.985. The distance between the plano surface and the entrance face 29 of the record carrier 25 is designed to be 100 μm. When the scanning is changed to record carrier 1, the distance between the piano surface and the entrance face 5 changes to 93 μm, i.e. a change of only 7 μm on a distance of 100 μm.

The scanning device is also suitable for scanning a multi-layer record carrier 35 as shown in FIG. 3. The record carrier comprises a transparent layer 36 with an entrance face 37, two information layers 38 and 39, separated by a transparent spacer layer 40, and a protective cover layer 41. The spacer layer may be a foil glued between the information layers or a UV-hardened spin-coated layer having a thickness of 30 μm. The material of the spacer layer may be a polymer such as poly-carbonate having a refractive index 1.58. The plano-convex lens 11 is preferable made according to design no. 4 or 7 of Table I. When the scanning is changed from information layer 38 to information layer 39, the objective lens 10 is moved axially such that the focus 16 is displaced from information layer 38 to information layer 39. The distance between the plano-convex lens 11 and the entrance face 37 of the record carrier does not change, i.e., the free working distance stays approximately the same.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. The scope of the invention is not limited to the embodiments, but lies in each and every novel feature or combination of features described above and in every novel combination of these features. Thus, the scope of the invention is only limited by the following claims:

What is claimed is:

1. An optical scanning device for optically scanning a record carrier comprising an information layer and a transparent layer, the device comprising an objective lens and a plano-convex lens for converging a radiation beam through the transparent layer to a focus on the information layer, the plano-convex lens having a convex surface facing the objective lens, and a planar surface facing the transparent layer, the objective lens and plano-convex lens are designed for forming a focus point at a distance of more than thirty focal depths of the converging radiation beam from an aplanatic point of the plano-convex lens.

2. The device of claim 1, wherein the transparent layer and the plano-convex lens have refractive indices $n_1$ and $n_2$ respectively, the value of $n_1$ being larger than the value of $n_2$.

3. The device of claim 2, wherein the refractive indices $n_1$ and $n_2$ are related through $(n_1-1) > 1.03 (n_2-1)$.

4. The device of claim 1, wherein the distance between the focus and an aplanatic point measured in micrometers is substantially equal to $3Rd_{gap}$, where R is the radius of the convex surface in millimeters and $d_{gap}$ the distance between the planar surface and the transparent layer in micrometers.

5. The device of claim 1, wherein the magnifying power of the plano-convex lens lies within a range from $1.1/n_2^2$ to $0.99/n_2$, $n_2$ being the refractive index of the plano-convex lens.

6. An optical scanning device for optically scanning a record carrier comprising an information layer and a transparent layer having a refractive index $n_1$, the device comprising an objective lens and a plano-convex lens for converging a radiation beam through the transparent layer to a focus on the information layer, the plano-convex lens having a convex surface facing the objective lens, a planar surface facing the transparent layer, a magnifying power and a refractive index $n_2$, the value of $n_1$ is larger than the value of $n_2$ and the magnifying power of the plano-convex lens is substantially equal to $1/n_1$.

7. The device of claim 6, wherein the refractive indices $n_1$ and $n_2$ are related through $(n_1-1) > 1.03 (n_2-1)$.

8. An optical scanning device for optically scanning a first and second type of record carrier, the first type of record carrier comprising a first information layer and a first transparent layer having a first thickness, the second type of record carrier comprising a second information layer and a second transparent layer having a refractive index $n_1$ and a second thickness larger than the first thickness, the device comprising an objective lens and a plano-convex lens for converging a radiation beam through the first or second transparent layer to a focus spot on the information layer, the plano-Convex lens having a convex surface facing the objective lens, a planar surface facing the transparent layer, a magnifying power and a refractive index $n_2$, the magnifying power of the plano-convex lens is substantially equal to $1/n_1$.

9. The device of claim 8, wherein the value of $n_1$ is larger than the value of $n_2$.

10. The device of claim 9, wherein the refractive indices $n_1$ and $n_2$ are related through $(n_1-1)>1.03(n_2-1)$.

11. An optical scanning device for optically scanning a record carrier comprising at least two adjacent information layers and a transparent spacer layer having a refractive index $n_1$ arranged between the information layers, the device comprising an objective lens and a plano-convex lens for converging a radiation beam to a focus spot on one of the information layers, the plano-convex lens having a convex surface facing the objective lens, a planar surface facing the transparent layer, a magnifying power and a refractive index $n_2$, the magnifying power of the plano-convex lens is substantially equal to $1/n_1$.

12. The device of claim 11, wherein the value of $n_1$ is larger than the value of $n_2$.

13. The device of claim 12, wherein the refractive indices $n_1$ and $n_2$ are related through $(n_1-1)>1.03(n_2-1)$.

14. The device of claim 12 in which the lenses focus the radiation beam to a focused spot on each of the two information layers at different times.

* * * * *